(12) United States Patent
Larroque et al.

(10) Patent No.: US 8,610,776 B2
(45) Date of Patent: Dec. 17, 2013

(54) SYSTEM FOR TARGET DESIGNATION AND/OR ILLUMINATION AND FOR AIR RECONNAISSANCE

(75) Inventors: Serge Larroque, Saint-Leger en Yvelines (FR); Patrick Unterreiner, Bures sur Yvette (FR); Olivier Verdy, Elancourt (FR)

(73) Assignee: Thales, Neuilly-sur-Seine (FR)

( * ) Notice: Subject to any disclaimer, the term of this patent is extended or adjusted under 35 U.S.C. 154(b) by 1490 days.

(21) Appl. No.: 11/910,916

(22) PCT Filed: Apr. 7, 2006

(86) PCT No.: PCT/EP2006/061464
§ 371 (c)(1),
(2), (4) Date: Oct. 7, 2007

(87) PCT Pub. No.: WO2006/106150
PCT Pub. Date: Oct. 12, 2006

(65) Prior Publication Data
US 2008/0084475 A1    Apr. 10, 2008

(30) Foreign Application Priority Data
Apr. 8, 2005 (FR) ..................... 05 03533

(51) Int. Cl.
H04N 7/18 (2006.01)
H04N 7/00 (2011.01)
H04N 13/02 (2006.01)

(52) U.S. Cl.
USPC ................. 348/144; 348/36; 348/47; 348/61; 348/844

(58) Field of Classification Search
USPC ................. 348/36, 47, 61, 144, 844
See application file for complete search history.

(56) References Cited

U.S. PATENT DOCUMENTS

| 4,034,208 A | * | 7/1977 | Vaeth et al. ................. 235/411 |
| 4,406,430 A | * | 9/1983 | Krammer et al. ............ 244/3.13 |
| 4,893,815 A | * | 1/1990 | Rowan ......................... 463/47.3 |
| 5,077,609 A | | 12/1991 | Manelphe et al. |
| 5,481,479 A | | 1/1996 | Wight et al. |
| 6,256,057 B1 | | 7/2001 | Mathews et al. |
| 6,568,627 B1 | * | 5/2003 | Jones et al. .................. 244/3.13 |
| 6,770,865 B2 | * | 8/2004 | Wootton et al. ............... 250/226 |
| 2001/0015755 A1 | | 8/2001 | Mathews et al. |
| 2002/0149674 A1 | * | 10/2002 | Mathews et al. ............. 348/144 |
| 2003/0234349 A1 | * | 12/2003 | Wootton et al. ............... 250/226 |
| 2005/0177307 A1 | * | 8/2005 | Greenfeld et al. ............ 701/220 |

FOREIGN PATENT DOCUMENTS

WO    03102505    12/2003

* cited by examiner

Primary Examiner — David Lazaro
Assistant Examiner — Vitali Korobov
(74) Attorney, Agent, or Firm — Lowe Hauptman & Ham, LLP

(57) ABSTRACT

The invention relates to a system for target designation and/or illumination in a scene, that is designed to be attached to an aircraft comprising one optical path fitted with a matrix sensor forming an image of the scene, each image corresponding to an instantaneous field centered around a line of sight LV, and fitted with a device for deflecting the LV at a determined speed Vd making it possible to carry out a scan in order to perform the target designation and illumination function. The system comprises an additional device for deflecting the LV at a speed Vr making it possible to carry out a counter-scan in order also to perform an air reconnaissance function.

8 Claims, 3 Drawing Sheets

SYSTEM FOR TARGET DESIGNATION AND/OR ILLUMINATION AND FOR AIR RECONNAISSANCE

CROSS-REFERENCE TO RELATED APPLICATIONS

The present Application is based on International Application No. PCT/EP2006/061464, filed on Apr.7, 2006, which in turn corresponds to France Application No. 0503533 filed on Apr. 8, 2005, and priority is hereby claimed under 35 USC §119 based on these applications. Each of these applications are hereby incorporated by reference in their entirety into the present application.

TECHNICAL FIELD

The field of the invention is that of target designation and/or illumination ("targeting") and of air reconnaissance.

BACKGROUND OF THE INVENTION

Currently target designation and/or illumination and air reconnaissance are performed by separate items of optronic equipment. These items of optronic equipment are for example pods attached to an aircraft.

There are reconnaissance pods and target designation and/or illumination pods. Target designation and/or illumination pods are less voluminous and lighter than reconnaissance pods.

The other differences between these families of pods lie in the fact that the designation and/or illumination pods:
  comprise one or more lasers making it possible to perform one or more of the following functions:
    telemetry, where necessary with ocular security, of a target or targets in the field,
    laser marking of a target or targets on behalf of another operator on land or in the air,
    laser illumination on behalf of one or more laser-guided weapons (guided for example according to the principles of the STANAG 3733)
  and that they are often capable of being oriented inside a large addressable field going typically from the half-space in front of the aircraft to rearward angles compatible with aircraft maneuvers such as "breaks" or "hippodromes" (for example a rearward addressable field in excess of 110° of the aircraft or pod axis).

In the context of operational missions, air reconnaissance is provided by a reconnaissance pod attached to a first aircraft which takes a picture of a determined zone. The images are transmitted to a station that analyzes them. If a target is present, the information relating to this target is transmitted to the target designation and/or illumination pod attached to another aircraft which receives the order to take off.

Currently, the time between the reconnaissance of a zone and the illumination of a target ("sensor to shooter loop") is approximately 180 minutes, which poses an operational problem notably in the case of targets that can be moved rapidly.

In addition, the two functions are performed by means of two aircraft.

The two pods may if necessary be attached to one and the same aircraft, which then poses problems of space requirement, weight or load-carrying capacity.

But in one case as in the other, two pods are used, which is costly.

SUMMARY OF THE INVENTION

An important object of the invention is therefore to be able to perform these two functions more rapidly and more economically.

To achieve this objective, the invention proposes a target designation and/or illumination system in a scene, that is designed to be attached to an aircraft and comprises at least one optical channel fitted with a matrix sensor forming an image of the scene, each image corresponding to an instantaneous field centered around a line of sight LV, and fitted with a device for deflecting the LV at a determined speed Vd making it possible to carry out a scan in order to perform the target designation and illumination function. It is mainly characterized in that it comprises an additional device for deflecting the LV at a speed Vr making it possible to carry out a counter-scan in order also to perform an air reconnaissance function.

The system according to the invention therefore consists in adding to an LV deflecting device, designed for the target designation and/or illumination function, another LV deflecting device in order also to perform an air reconnaissance function.

This system makes it possible to combine the two functions of target designation and/or illumination on the one hand and of air reconnaissance on the other hand, for example in a single pod, namely the target designation and/or illumination pod, that is smaller, lighter and compatible with the movements of the aircraft in flight.

Such a system is less costly than the two separate systems of the prior art. Also, it prevents having to use a second aircraft and therefore makes it possible to save time.

According to one feature of the invention, this additional device comprises an optical element for deflecting the LV and means capable of moving this element at the speed Vr.

Preferably, the system comprising a sensor capable of operating for a period D, and of incorporating the photonic signal corresponding to the instantaneous field for a duration I, the means are capable of moving the deflecting element at the speed Vr, in order to compensate for the movement of the system attached to the aircraft, over a minimal amplitude equal to the instantaneous field×I/D, at a minimal frequency of 5 Hz in a direction that is lateral, preferably perpendicular, or where necessary parallel to the path of the aircraft.

According to one feature of the invention, the system comprising a bending mirror capable of performing the target designation and/or illumination function, this mirror is also the element for deflecting the LV.

The deflecting element may be an optical strip.

Advantageously the system comprises an IR optical channel and/or a near-infrared channel and/or a visible channel.

A further subject of the invention is a pod or an optronic turret comprising a system as described.

Finally, the invention relates to an air reconnaissance method capable of forming images, each image corresponding to an instantaneous field centered around a line of sight LV, and that comprises the following steps of:
  scanning the LV with a probe element fitted with a matrix sensor, in a determined direction at least during the time of integration of the sensor,
  counter-scanning in the opposite direction by means of a deflecting device in order to stabilize the LV during the integration of the sensor,
characterized in that it also comprises the following steps of:
  deactivating the counter-scan, target designation and/or illumination by means of the matrix sensor during this step of deactivating the counter-scan.

BRIEF DESCRIPTION OF THE DRAWINGS

Other features and advantages of the invention will appear on reading the following detailed description given as a non-limiting example and with reference to the appended drawings in which.

DETAILED DESCRIPTION OF THE DRAWINGS

A target designation and/or illumination pod conventionally comprises three sections.

A nose cone that makes it possible to perform the image-formation, scanning, telemetry and illumination functions and that will be described in detail below.

A central section that provides the mechanical interface with the aircraft and that comprises the following functional modules:
- a command and control unit associated with electronic circuit boards dedicated to servomechanism functions. It generates the line of sight movement and stabilization instructions, supervises the pod in its entirety, records the images and transmits them via data links;
- electronic equipment dedicated to advanced functions;
- an electric power supply;
- an electric adapter;
- a filtering module;
- a solid state recorder;
- a roll section that rotates the nose cone on the pod axis and allows the orientation of the line of sight of the pod.

The third section is an environmental conditioning unit or ECU that autonomously controls the temperature inside the pod according to the flight conditions. It is motorized so as to maintain performance on the ground or during very low or very high altitude flights.

The invention relates more specifically to the nose cone that comprises a spin-stabilized orientable head, an optical block and a casing.

According to the invention, consideration is given to a target designation and/or illumination system in a scene; it is fitted with one (or more) matrix sensor(s) forming an image of the scene, each image corresponding to an instantaneous field centered around a line of sight LV.

Figure 1:
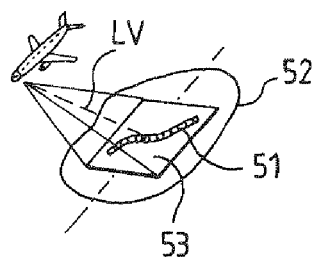
FIG. 1 represents schematically an example of a target in a scene, and the corresponding instantaneous field, centered around a line of sight LV.

FIG. 1 shows an example of a target 51 in a scene 52, and the corresponding instantaneous field 53, centered on a line of sight LV. The compatible scene of an air surveillance mission is a terrestrial, or maritime, or aerial, or spatial scene.

Figure 2:
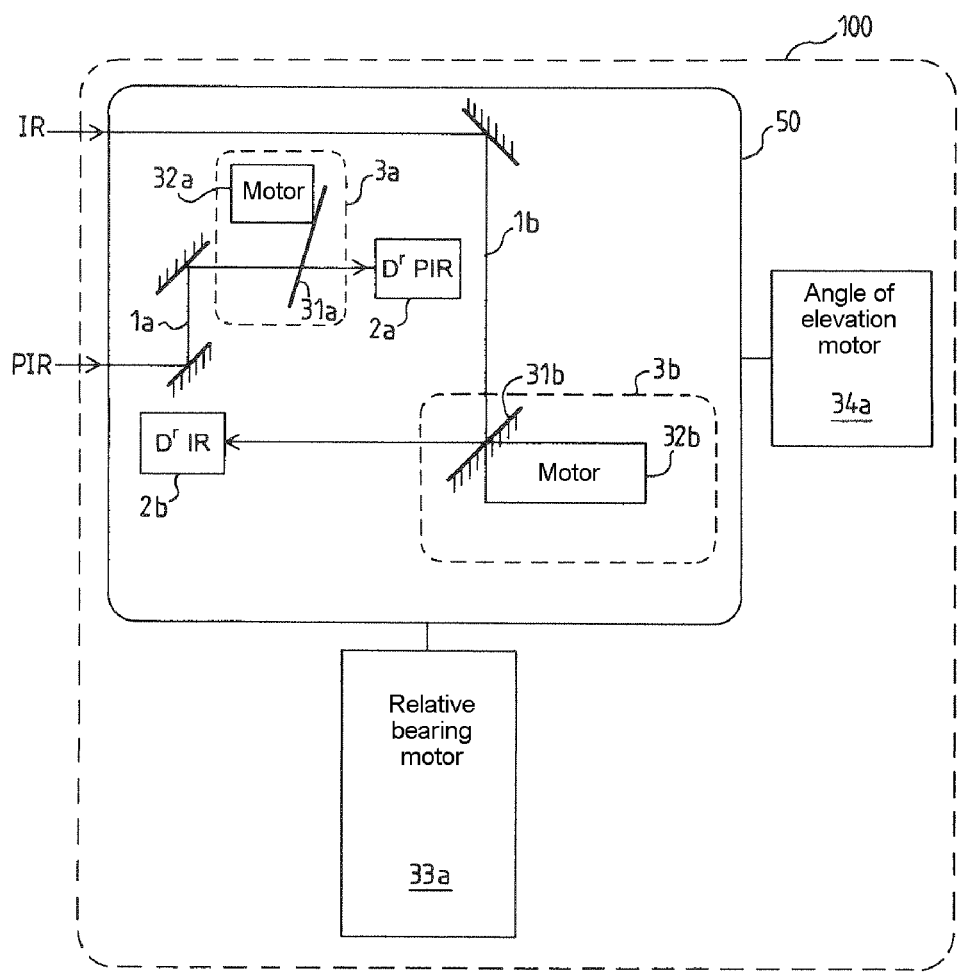
FIG. 2 represents schematically an exemplary embodiment of a system according to the invention.

FIG. 2 shows a particular embodiment of a system 100 according to the invention. It comprises a probe element 50 with two optical channels: a PIR near-infrared channel 1a that comprises a PIR matrix sensor 2a and an IR infrared channel 1b that comprises an IR matrix sensor 2b.

The target designation and/or illumination function is performed on each optical channel by means of an LV deflecting device at a speed Vd making it possible to track the target. This device is based for example on cardan articulation joint shafts associated with the probe element 50 and motorized in angle of elevation and in relative bearing thanks to two motors 34a and 33a.

The system according to the invention also makes it possible to perform an air reconnaissance function according to a mode called "step and stare".

To perform this function, each optical channel of the system according to the invention comprises an additional LV deflecting device at a speed Vr making it possible to obtain a stability of the LV during the time of integration of the sensor.

This "step and stare" mode will now be described.

Figure 3:
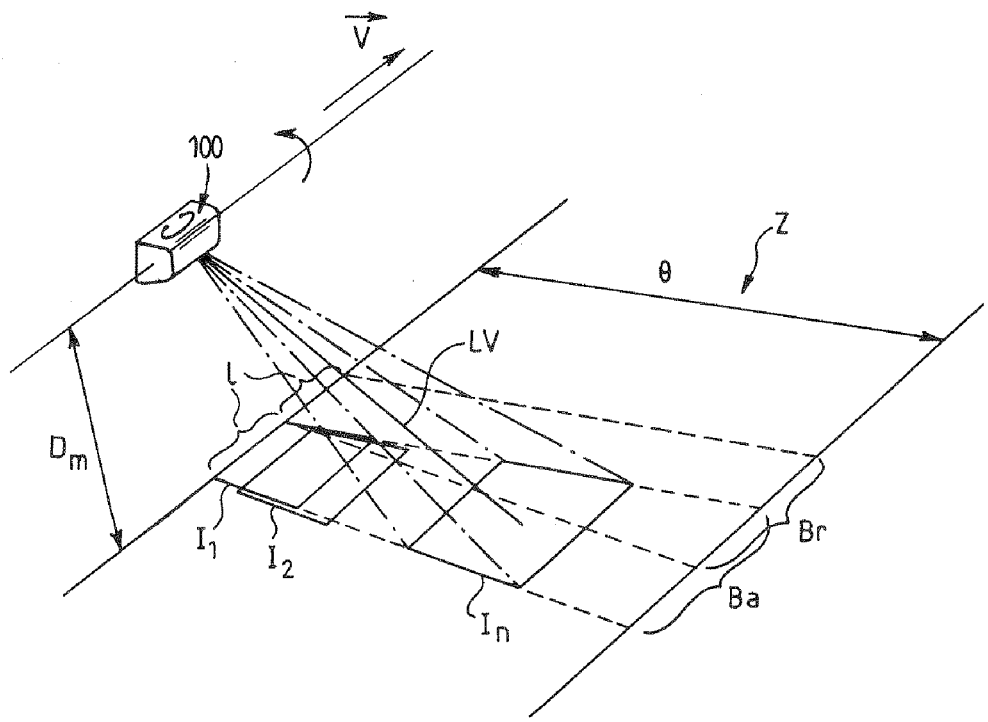
FIG. 3 represents schematically the principle of applying a panoramic-type scan.

Successive images are produced at a high rate during a panoramic scan as illustrated in FIG. 3. Note that, in panoramic mode, the image of the matrix sensor is projected onto the ground laterally by rotating the line of sight LV about an axis V defined by the speed vector of the aircraft. This scan is made by oscillating the probe element 50 about the axis V by means of the angle of elevation motor 34a, at a constant angular velocity and makes it possible to scan a zone Z on the ground. Consider in particular that images are acquired both during the "outgoing" oscillation and during the "return" oscillation; hence the terms outgoing scan and return scan are used.

In addition, a compensating scan or counter-scan is used to make it possible to obtain a stability of the entire scan during the times of integration.

Figure 4:
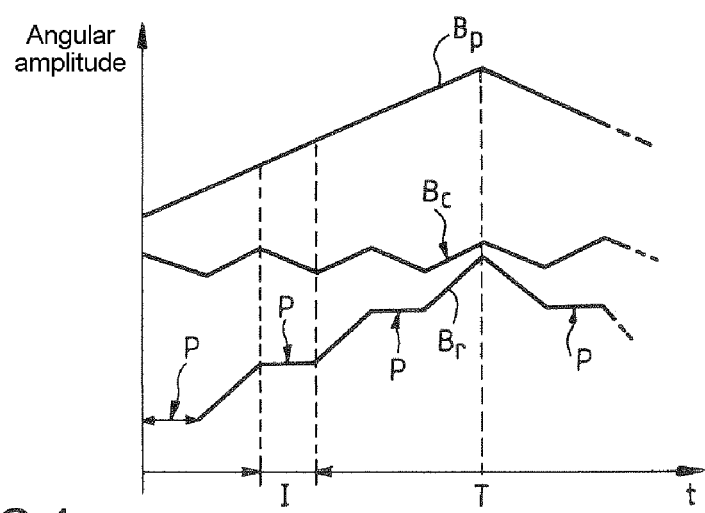
FIG. 4 represents schematically the line of sight scanning curves obtained if the main scan and a counter-scan are combined.

FIG. 4 indicates the angular amplitude curves as a function of time t, of the main scan Bp of the half-period line of sight T, of a compensating scan Bc and of the scan Br resulting from the composition of the two previous scans. The compensating scan Bc is, in this exemplary embodiment, of the sawtooth type. It has a trailing edge with a slope and duration such that the plateaux P that appear on the resulting scan Br, by composition of the scans during their opposite phase, correspond to the integration time I of the sensor. During the main return scan, the slopes of the curves Bp and Br are inverted. The durations of the rising and trailing edges of the compensating scan may be adapted according to the duration of integration of the matrix sensor. After each image acquisition, that is to say after the compensating scan, the additional LV deflecting device rapidly returns to its initial position in order to acquire the next image, the various images overlapping one another.

The additional LV deflecting device comprises an optical LV deflecting element and means capable of moving this element rapidly, such as one or more motors.

In the example of FIG. 2, the optical element 31a of the PIR channel is an optical strip connected to a motor 32a. Its reflection factor is for example of the order of 1% and its transmission factor of the order of 99%. The optical element 31b of the IR channel is a movable mirror; it is also used as a mirror for bending the optical channel, in the context of the target designation and/or illumination function. It is connected to a motor 32b.

The motor 32a respectively 32b is capable of moving the optical element 31a respectively 31b at a speed Vr at least k times greater than Vd, where k≥1.5. Specifically, the deflection of the LV in the case of air reconnaissance according to this "step and stare" mode must usually be much faster than in the case of target tracking.

The speed Vr will now be defined more precisely. A matrix sensor operates cyclically. A cycle comprises a photonic signal integration phase corresponding to the instantaneous field that converts the photons into electrons, and an electron reading phase. I is the time of integration of the sensor, L the reading time and D the duration of operation of the sensor (D=I+L).

The speed Vr is determined so as to compensate for the movement of the system attached to the aircraft, on a minimal amplitude equal to the instantaneous field×I/D, at a minimal frequency of 5 Hz in a lateral direction, preferably perpendicular or where necessary parallel to the axis V. The optical elements 31a and 31b can therefore be orientated in a first direction to compensate for the movement of the system in the system-scene direction and, where necessary, in another direction to compensate for the movement of the system in the direction V.

A pod is usually fitted with a structure that can be oriented in relative bearing making it possible to compensate for the movement parallel to the axis V. According to a particular embodiment, the orientation in the direction perpendicular to the system-scene direction is provided by this structure: this therefore makes it possible to carry out a scan common to both the IR and PIR channels.

Figure 5:
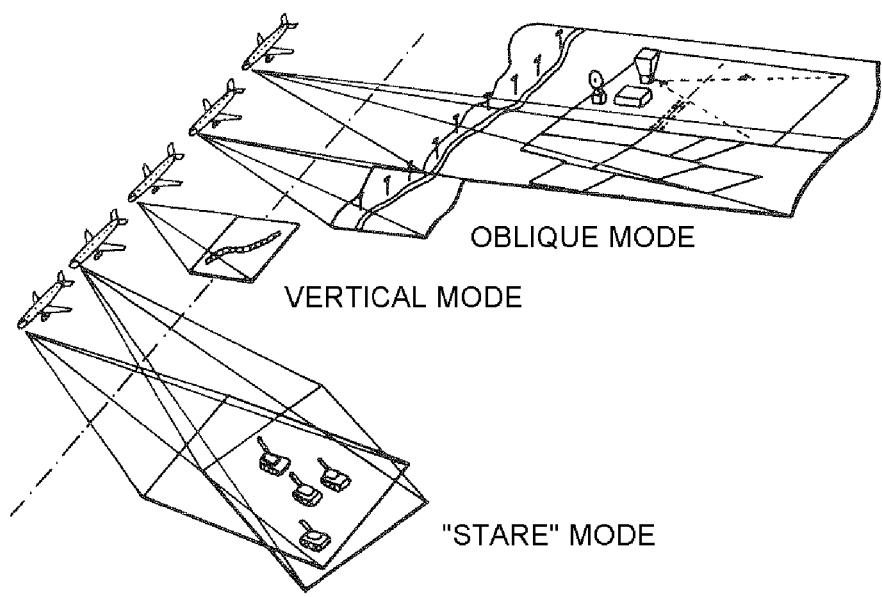
FIG. 5 illustrates schematically three "step and stare" image acquisition methods.

The additional LV deflecting device also comprises in a conventional manner an element for measuring the position of the optical element, in this instance the mirror or the strip. This measuring element comprises a transmitter, for example a laser diode, and a receiver. There are three different "step and stare" modes respectively illustrated in FIG. 5:
- a "vertical" mode used to cover a zone that extends along a line about an axis V defined by the speed vector of the aircraft,
- an "oblique" mode used to cover a predefined zone, the scan of this zone being obtained in the form of bands,
- a "stare" mode used to allow a detailed analysis of specific targets at great distance.

These three modes may be strung together during one and the same flight.

When the system according to the invention is installed onboard a pod, it makes it possible to perform both functions of air reconnaissance and target designation and/or illumination. These two functions are not performed at the same time, but successively.

To perform the target designation and/or illumination function, it is necessary for the LV counter-scanning function, that is used only for air reconnaissance, to be deactivated: in the example of FIG. 2, this deactivation means that the mirror 31b and the optical strip 31a are immobilized.

The system according to the invention may be installed onboard a pod or else in an optronic turret designed to be attached to a drone or a helicopter.

The invention claimed is:

1. A system for laser target designation and/or illumination in a scene, that is adapted to be attached to an aircraft, and to be oriented in an instantaneous field greater than 60° in which a line of sight LV is centered, said system comprising:
- at least one telemetry and/or target designation and/or illumination laser;
- at least one optical channel fitted with a matrix sensor forming an image of the scene, each image corresponding to the instantaneous field centered around the line of sight LV, and fitted with a device for deflecting the line of sight LV at a determined speed Vd so as to carry out a scan in order to perform a laser target designation and illumination function; and
- an additional device for deflecting the line of sight LV at a speed Vr so as to carry out a counter-scan in order to perform an air reconnaissance function,
- wherein the additional device comprises an optical deflecting element for deflecting the line of sight LV and a device for moving the optical deflecting element at the speed Vr.

2. The system as claimed in claim 1, further comprising a sensor configured to operate for a period D, and configured to incorporate a photonic signal corresponding to the instantaneous field for a duration I,
- wherein the optical deflecting element is movable by the device for moving the deflecting element at the speed Vr, in order to compensate for the movement of the system adapted to be attached to the aircraft, over a minimal amplitude equal to the instantaneous field×I/D, at a minimal frequency of 5 Hz in a direction that is lateral or parallel to a path of the aircraft.

3. The system as claimed in claim 2, wherein the lateral direction is perpendicular to the path of the aircraft.

4. The system as claimed in claim 1, wherein the system further comprises a bending mirror configured to perform the laser target designation and illumination function, and the mirror is an optical element for deflecting the line of sight LV.

5. The system as claimed in claim 1, wherein the optical deflecting element is an optical strip.

6. The system as claimed in claim 1, wherein the scene is at least one of terrestrial, maritime, aerial or spatial.

7. The system as claimed in claim 1, further comprising an IR optical channel and/or a near-infrared channel and/or a visible channel.

8. An air reconnaissance method of forming images, each image corresponding to an instantaneous field centered around a line of sight LV, said method comprising the steps of:
- scanning the line of sight LV with a probe element fitted with a matrix sensor, in a determined direction at least during the time of integration of the sensor,
- counter-scanning in a direction opposite to the determined direction by a deflecting device in order to stabilize the line of sight LV during integration of the sensor,
- deactivating the counter-scan, and
- laser target designation and/or illumination by the matrix sensor during said step of deactivating the counter-scan,
- wherein an additional device comprises an optical deflecting element for deflecting the line of sight LV and a device for moving the optical deflecting element at a speed Vr.

* * * * *